UNITED STATES PATENT OFFICE.

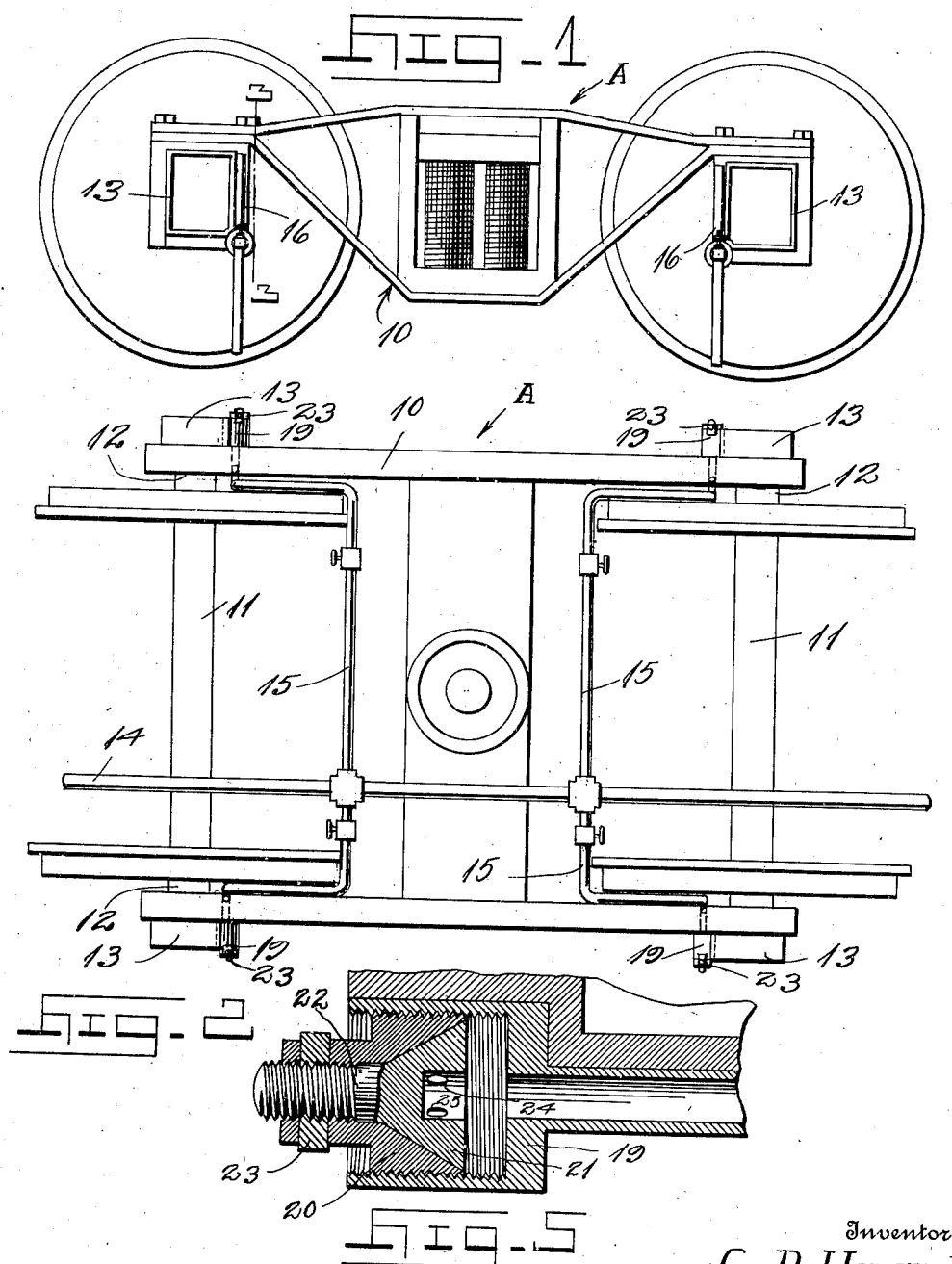

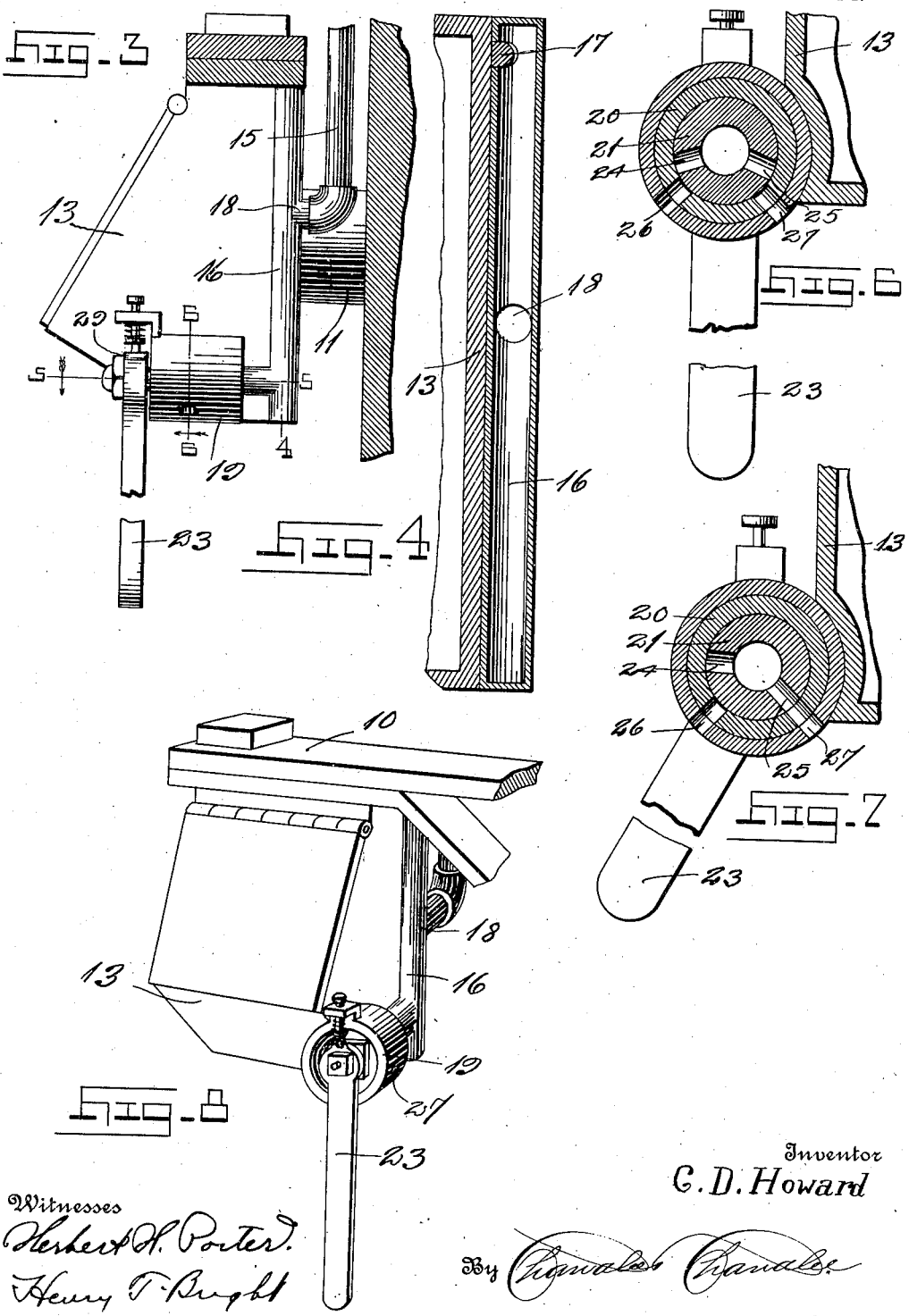

GEORGE D. HOWARD, OF RUFFIN, NORTH CAROLINA.

BRAKING DEVICE.

1,044,180.   Specification of Letters Patent.   Patented Nov. 12, 1912.

Application filed January 2, 1912. Serial No. 868,967.

*To all whom it may concern:*

Be it known that I, GEORGE D. HOWARD, a citizen of the United States, residing at Ruffin, in the county of Rockingham, State of North Carolina, have invented certain new and useful Improvements in Braking Devices; and I do hereby declare the following to be a full, clear, and exact description of the invention, such as will enable others skilled in the art to which it appertains to make and use the same.

This invention relates to braking devices and particularly to that type adapted for association with air brake systems on railroad cars to automatically effect the actuation of the air brakes under predetermined conditions.

The object of the invention resides in the provision of a device of the character referred to suitably connected with the air brake mechanism and adapted to apply the brake in the event of a hot box so as to warn the trainmen and prevent the breaking of or injury to the hot journal.
A further object of the invention resides in the provision of a device of the character named which is adapted to automatically apply the air brakes in case of derailment of a car or cars in a given train.
With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a side elevation of a truck showing the invention applied, Fig. 2, a plan view of what is shown in Fig. 1, Fig. 3, an enlarged section on the line 3—3 of Fig. 1, Fig. 4, a section on the line 4—4 of Fig. 3, Fig. 5, a section on the line 5—5 of Fig. 3, Fig. 6, a section on the line 6—6 of Fig. 3, Fig. 7, a view similar to Fig. 6 showing the position of the parts of the device in case of derailment, and Fig. 8, a detail perspective view of the device applied to a journal box.

Referring to the drawings, A indicates generally the truck which includes a frame 10, axles 11, journal bearing 12 for said axle, and a journal box 13 surrounding each journal bearing all of which are of a well known construction.

The train pipe of the air brake mechanism is indicated at 14 and is provided adjacent each axle 11 with laterally directed branch pipes 15. Mounted upon the sides of each journal box 13 is a vertical pipe member 16 the upper end of which is provided with a fusible plug 17, while the intermediate portion thereof connects with a branch pipe 15 at 18. The lower end of the pipe member 16 is provided with a laterally directed internally threaded enlarged portion 19 which is also secured to the adjacent side of the box 13. Threaded in the portion 19 is a valve seat 20 in which is rotatably mounted a tapered valve 21, the major end of which latter is disposed toward the pipe member 16, while the minor end is provided with a stem 22 to which is secured an operating lever 23. The valve 21 is provided with a pair of openings 24 and 25 which are out of registration with openings 26 and 27 in the enlarged portion 19 when the lever 23 is disposed vertically. It will of course be understood that the valve seat 20 is also provided with openings which constantly register with the openings 26 and 27. By this construction it will be apparent that as the lever 23 is swung to one side a sufficient distance the opening 24 in the valve 21 will register with the opening 26 in the portion 19, while the movement of said lever a sufficient distance in the opposite direction will bring the opening 25 into registration with the opening 27. This movement of the lever 23 is adapted to take place upon derailment of the car, said lever being then brought in contact with the ground or with some object beside the car, as the movement of the lever 23 in either direction will serve to open the pipe member 16 to the atmosphere it will be apparent that it is immaterial to the proper functioning of the lever in what direction the car is moving. The upper end of the lever 23 is provided with a detent 29 which is engaged by a spring pin supported upon the box 13. This pin serves to hold the lever against movement as the result of jarring or other causes but will readily yield to permit movement of the lever in case of derailment.

It will thus be apparent that the device previously described will automatically set the brakes in case of either a hot box or of derailment. In the first instance the heat from the hot box will melt the fusible plug 17 and result in the air in the train pipe being exhausted which will of course automatically set the brake. In the second instance the movement of the lever 23 will rotate the valve 21 so as to bring either the opening 24 into registration with the opening 26 or the opening 25 into registration with the opening 27 which will also result in the exhaustion of the air from the train pipe 14 and the application of the brake.

What is claimed is:

In a valve adapted to be applied to a car truck and to be connected with an air brake, an air pipe having a cylindrical valve casing communicating therewith, said valve casing having radial apertures communicating with the outer air, a valve seat secured in the casing and having radial apertures registering with the apertures of the casing, a valve member rotatably fitted in the valve seat and being axially alined with the air pipe and having apertures normally out of registration with the adjacent apertures of the valve seat, a normally vertical and depending lever secured on the valve member and adapted to be moved in either of two alternative directions and to bring either of the apertures of the valve member into registration with the adjacent aperture of the valve seat for establishing communication between the air pipe and the outer air.

In testimony whereof, I affix my signature, in presence of two witnesses.

GEORGE D. HOWARD.

Witnesses:
LESTER A. SCHINN,
EDWARD T. BURGESS.